(12) United States Patent
Hosoda et al.

(10) Patent No.: US 7,397,498 B2
(45) Date of Patent: Jul. 8, 2008

(54) CAMERA DEVICE AND METHOD AND PROGRAM FOR STARTING THE CAMERA DEVICE

(75) Inventors: Jun Hosoda, Hanno (JP); Kenji Yoshizawa, Ome (JP); Koki Nakamura, Sakado (JP); Yasushi Maeno, Higashimurayama (JP); Hidetoshi Sumi, Higashiyamoto (JP); Tetsuya Hayashi, Hanno (JP)

(73) Assignee: Casio Computer Co., Ltd., Tokyo (JP)

( * ) Notice: Subject to any disclaimer, the term of this patent is extended or adjusted under 35 U.S.C. 154(b) by 596 days.

(21) Appl. No.: 10/787,447

(22) Filed: Feb. 25, 2004

(65) Prior Publication Data
US 2004/0169743 A1 Sep. 2, 2004

(30) Foreign Application Priority Data
Feb. 28, 2003 (JP) ............................... 2003-053011

(51) Int. Cl.
H04N 5/225 (2006.01)
H04N 9/04 (2006.01)
H04N 5/232 (2006.01)
G03B 7/26 (2006.01)
G06F 9/00 (2006.01)
G06F 9/24 (2006.01)
G06F 15/177 (2006.01)

(52) U.S. Cl. ............... 348/207.99; 348/211.6; 396/280; 713/1; 713/2

(58) Field of Classification Search ............... 713/1, 713/2; 396/76, 77, 90, 103, 280; 348/207.99, 348/211.6, 372
See application file for complete search history.

(56) References Cited

U.S. PATENT DOCUMENTS

| 5,424,776 | A | * | 6/1995 | Hirasawa ................. 348/345 |
| 5,819,120 | A | | 10/1998 | Hamada et al. |
| 6,097,548 | A | | 8/2000 | Funahashi et al. |
| 6,212,632 | B1 | | 4/2001 | Surine et al. |
| 6,341,201 | B1 | | 1/2002 | Ishiguro et al. |
| 6,401,202 | B1 | * | 6/2002 | Abgrall ...................... 713/2 |
| 6,470,413 | B1 | | 10/2002 | Ogawa |

(Continued)

FOREIGN PATENT DOCUMENTS

EP 1 083 740 A2 2/2001

(Continued)

OTHER PUBLICATIONS

Related U.S. Appl. No. 10/785,534, filed Feb. 23, 2004; Inventor: T. Hayashi et al.; Title: Camera Device and Method and Program for Starting the Camera Device.

(Continued)

Primary Examiner—David Ometz
Assistant Examiner—Wanda M. Negrón
(74) Attorney, Agent, or Firm—Frishauf, Holtz, Goodman & Chick, P.C.

(57) ABSTRACT

A camera device comprises a movable optical system, a driving unit which drives the optical system, and a control unit which controls the driving unit to move the optical system to a predetermined state by an initialization processing based on a startup program which does not comprise an operating system and then controls the driving unit based on the control program comprising the operating system.

2 Claims, 8 Drawing Sheets

U.S. PATENT DOCUMENTS

| | | | |
|---|---|---|---|
| 6,487,656 B1 * | 11/2002 | Kim et al. | 713/2 |
| 6,766,474 B2 * | 7/2004 | Schelling | 714/36 |
| 7,129,984 B1 * | 10/2006 | Okada et al. | 348/372 |
| 2001/0007472 A1 | 7/2001 | Nishimura | |
| 2001/0009443 A1 * | 7/2001 | Suemoto et al. | 348/358 |
| 2002/0171755 A1 | 11/2002 | Nishimura | |
| 2004/0165073 A1 | 8/2004 | Hayashi et al. | |
| 2004/0165096 A1 | 8/2004 | Maeno et al. | |
| 2004/0170421 A1 | 9/2004 | Yoshizawa | |

FOREIGN PATENT DOCUMENTS

| | | | |
|---|---|---|---|
| EP | 1452972 A | | 9/2004 |
| JP | 2001-268413 A | | 9/2001 |
| JP | 2001268413 A | * | 9/2001 |
| JP | 2002-237977 A | | 8/2002 |
| KR | 1991-0006855 B1 | | 4/1991 |
| KR | 1996-0018747 B1 | | 6/1996 |
| KR | 1999-0037012 A | | 5/1999 |
| KR | 2002-0010846 A | | 2/2002 |

OTHER PUBLICATIONS

Related U.S. Appl. No. 10/787,445, filed Feb. 25, 2004; Inventor: Y. Maeno et al.; Title: Camera Device and Method and Program for Starting the Camera Device.

Related U.S. Appl. No. 10/787,446, filed Feb. 25, 2004; Inventor: K. Yoshizawa et al.; Title: Camera Device and Method and Program for Starting the Camera.

European Search Report dated Apr. 3, 2008 issued in counterpart EP Appln No. 04004389.5-1241.

* cited by examiner

CAMERA DEVICE AND METHOD AND PROGRAM FOR STARTING THE CAMERA DEVICE

CROSS-REFERENCE TO RELATED APPLICATIONS

This application is based upon and claims the benefit of priority from prior Japanese Patent Application No. 2003-053011, filed Feb. 28, 2003, the entire contents of which are incorporated herein by reference.

BACKGROUND OF THE INVENTION

1. Field of the Invention

The present invention relates to a camera device having a movable optical system, and a method and a program for starting the camera device.

2. Description of the Related Art

Conventionally, in electronic still cameras or digital cameras, an object is picked up by an image pickup element such as a CCD or the like, and while the image is being displayed as a through image on a liquid crystal display device, the picked-up image is recorded as digital data on a recording medium such as a memory card or the like in accordance with an operation of a shutter. Accordingly, at the time of startup when the power supply of an electronic still camera is turned on for photographing, various initializing operations with respect to both of the hardware and the software, for example, such as a preparation for making data to be able to be recorded on a recording medium, a preparation for image picking-up an object, and a preparation for displaying the picked-up image, are indispensable. As a time from the power-on until when it is in a state in which photographing is available, a given starting time which is longer than that in the case of a silver salt camera or an analog camera is required. Therefore, there is the shortcoming that the electronic still cameras or the digital cameras cannot cope with an urgent chance to press a shutter key.

Therefore, in order to make shortening of the above-described starting time to be possible, a conventional example in which a time of reading management information from an freely attachable and detachable memory card is omitted is disclosed in paragraph 0025 of Japanese Patent Application KOKAI Publication No. 2002-237977.

However, in an electronic still camera, which has a movable or sinkable optical system in which a lens is housed in a camera housing during non-photographing and it is necessary to protrude the zoom lens prior to photographing, the time required for protruding the optical system accounts for most of the starting time. Therefore, even if the time of reading management information from a memory card is omitted as in the conventional document, the time accounts for extremely small percentage of the total starting time, and there is the problem that an effect on reduction in starting time has not been satisfactory yet.

BRIEF SUMMARY OF THE INVENTION

The present invention has been achieved in consideration of the conventional problem, and an object of the present invention is to provide a camera device which can reduce the starting time in an electronic still camera having a movable optical system, a method for starting the camera device, and a program used for realizing those.

According to an embodiment of the present invention, a camera device comprises an optical system, a driving unit which drives the optical system, and a control unit which controls the driving unit to move the optical system to a predetermined state by an initialization processing based on a startup program which does not comprise an operating system and then controls the driving unit based on the control program comprising the operating system.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which.

DETAILED DESCRIPTION OF THE INVENTION

Figure 1:
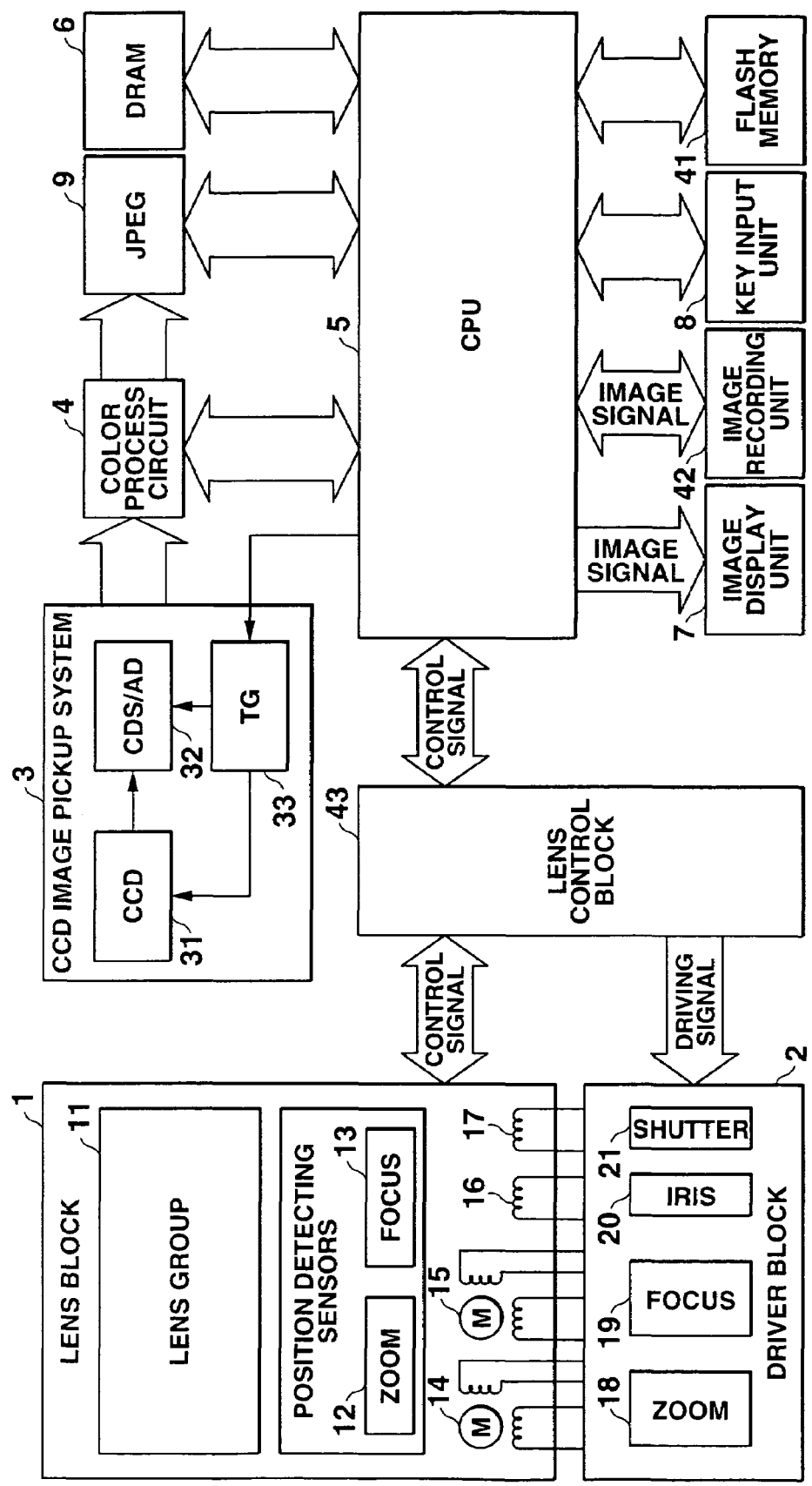
FIG. 1 is a block diagram schematically illustrating an electronic still camera showing an embodiment of the present invention.

An embodiment of a camera device according to the present invention will now be described with reference to the accompanying drawings. FIG. 1 is a block diagram illustrating an electrical configuration of an electronic still camera showing the embodiment of the present invention.

The electronic still camera has a zooming function and an automatic focusing function, and has a lens block 1 for realizing the functions. The lens block 1 comprises a movable or sinkable lens group 11 including a zoom lens and a focus lens which are movably arranged in the direction of an optical axis, position detecting sensors 12, 13 for a zoom position and a focus position in the lens group 11, a zoom motor 14 for moving the zoom lens and a focus motor 15 for moving the focus lens, an actuator 16 for an iris which opens and closes an iris (not shown), and an actuator 17 for a shutter which opens and closes a mechanical shutter. The above-described respective motors and actuators 14 to 17 are driven by various drivers 18 to 21, for zooming, for focusing, for an iris, and for a shutter, which are provided at a driver block 2. The respective motors 14, 15 and actuators 14 to 17, and the driver block 2 configure driving means.

The electronic still camera has a CCD image-pickup system block 3 including mainly a CCD 31 which is an image pickup element arranged at the rear side of the photographing optical axis of the lens group 11, a CDS (Correlated Double Sampling)/AD conversion block 32, and a TG (Timing Generator) 33. When the electronic still camera is set to a recording mode for photographing, the CCD 31 photoelectric-converts an optical image of an object which is formed by the lens group 11, and outputs, each given cycle, one photoelectric-converted output screen by being scanning-driven by the TG 33. The CDS/AD block 32 carries out noise elimination due to correlated double sampling and conversion into a digital signal with respect to an output analog signal whose gain has been appropriately adjusted for each of the color components of RGB by an amplifier (not shown) after being output from the CCD 31, and outputs the signal as an image pickup signal to a color process circuit 4.

The color process circuit 4 performs color process processing including pixel interpolation processing to the input image pickup signal, generates digital-valued luminance signal (Y) and color-difference signals (Cb, Cr), and outputs the signals to a CPU 5 serving as control unit for controlling the entire electronic still camera. The CPU 5 comprises a microprocessor having an internal memory, various arithmetic processing circuits, an I/O interface for data, and the like.

The digital signal (image signal) transmitted to the CPU 5 is temporarily stored in a DRAM 6 and transmitted to an image display unit 7. The image display unit 7 includes a video encoder, a VRAM, a liquid crystal monitor, and a driving circuit thereof, and generates a video signal based on the transmitted video signal by the video encoder, and a display image based on the video signal, i.e., a through image of the object picked up by the CCD 31 is displayed on the liquid crystal monitor.

A key input unit 8 comprises various keys such as a power key, a recording/playback mode change-over switch, a shutter key, a menu key, or the like, and a sub-CPU which receives input therefrom and transmits an operation signal corresponding thereto to the CPU 5. The sub-CPU transmits a state signal showing a state of the mode change-over switch, i.e., a mode setting state as needed. When the shutter key is pressed down in the aforementioned recording mode, a trigger signal (operation signal) is output from the key input unit 8 to the CPU 5.

When the trigger signal is input, the CPU 5 reads out, for each of the components of Y, Cb, Cr and in basic units called basic blocks which are 8 pixels (vertical)×8 pixels (horizontal), the image data of one screen fetched from the CCD 31 at that point in time, and writes the image data into a JPEG circuit 9. The JPEG circuit 9 carries out DCT (Discrete Cosine Transform) and coding. The compressed one-image data compressed by the JPEG circuit 9 is stored in an image recording unit 42. The image recording unit 42 comprises a card interface, and nonvolatile various memory cards which are connected to the CPU 5 via the card interface, and which are mounted so as to be freely attachable and detachable on a camera body.

In the recording mode for photographing, the CPU 5 makes a lens control block 43 generate driving signals to be transmitted to the various drivers 18 to 21 of the driver block 2 on the basis of various programs stored in a rewritable nonvolatile flash memory 41, the aforementioned operation signal from the key input unit 8, or the like, and controls the position controls of the zoom lens and focus lens, an opening of the iris, and the opening and closing action of the mechanical shutter. Positional information of the lens detected by the position detecting sensors 12, 13 for a zoom position and a focus position are successively input to the CPU 5 via the lens control block 43.

On the other hand, the image data recorded in the image recording unit 42 is read by the CPU 5 in the playback mode for displaying the recorded image, transmitted to the image display unit 7 after being expanded by the JPEG circuit 9, and displayed on the liquid crystal monitor.

Figure 2:
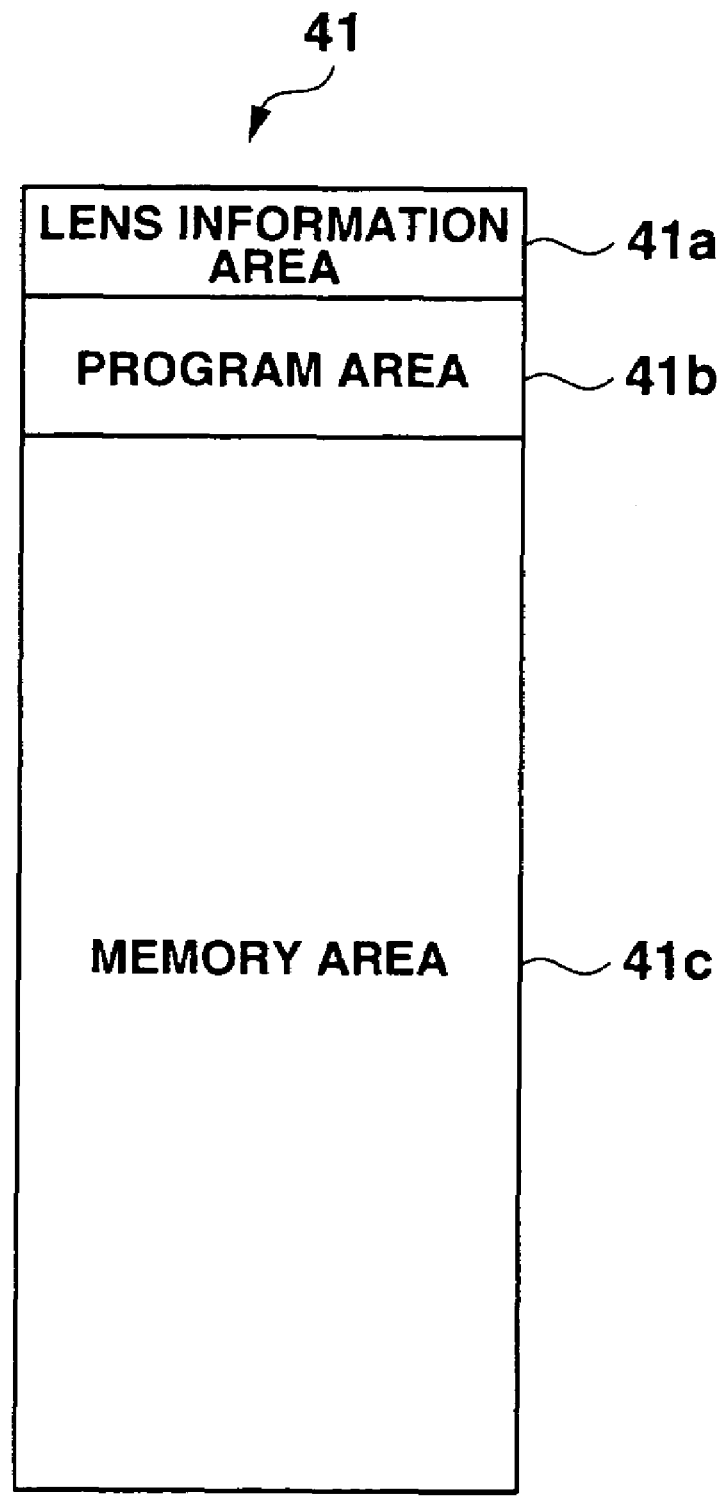
FIG. 2 is a schematic diagram showing a data storing structure of a flash memory in the electronic still camera of the embodiment.

FIG. 2 is a schematic diagram showing a data storing structure of the aforementioned flash memory 41. The flash memory 41 is storage means, and a lens information area 41a, a program area 41b, and memory area 41c for various data are ensured therein. At the lens information area 41a, device information which is the data acquired at the stage of factory shipping of the electronic still camera, and which shows the device performance of the lens group 11 (the zoom lens and the focus lens), and which is the adjustment data which is indispensable for controlling those, is stored. Moreover, at the lens information area 41a, device information of the image pickup system of the CCD 31, white balance characteristic, or the like, as well, are stored.

Figure 3:
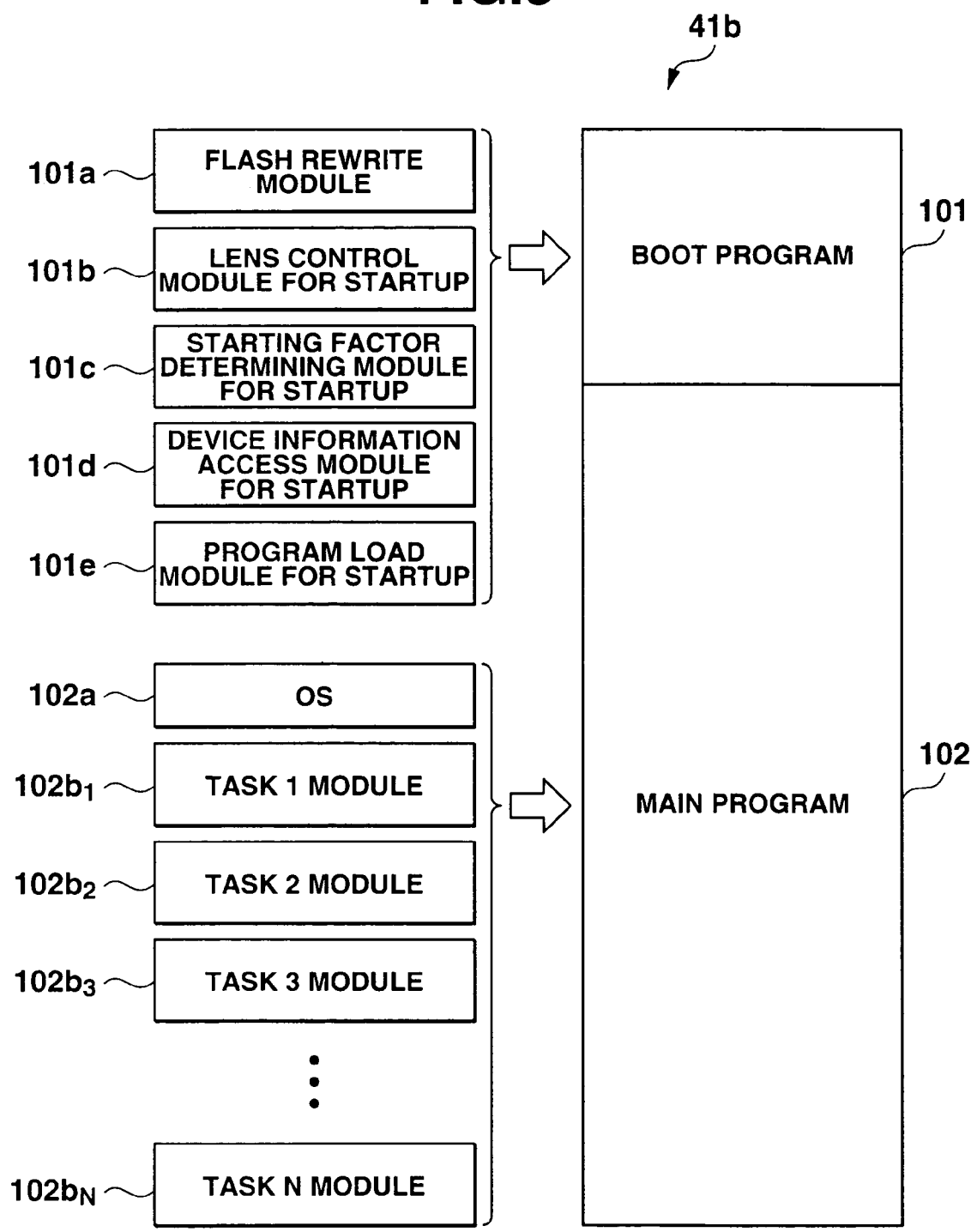
FIG. 3 is a schematic diagram showing stored data at a program area of the flash memory.

At the program area 41b, programs required for the control the aforementioned respective portions by the CPU 5, and various data required for the control are stored. In the present embodiment, as one example, as shown in FIG. 3, the program area 41b comprises a boot program area 101 and a main program area 102 which are sequentially provided. The boot program area 101 stores programs for startup which are first read when the camera device is powered on, such as a flash rewrite module 101a, a lens control module 101b for startup, a starting factor determining module 101c for startup, a device information access module 101d for startup, and a program load module 10le for startup. The lens control module 101b sets an interrupt necessary for controlling the lens group 11. The flash rewrite module 101a may be omitted. The main program area 102 stores an OS (Operating System) 102a which is indispensable for the operation of the CPU 5 and a plurality of task modules $102b_1$, $102b_2$, . . . $102b_N$ (TASK 1, TASK 2, TASK 3, . . . TASK N) which are required for realizing various operations in the electronic still camera are stored.

The memory area 41c is a area which is managed by a file system configured by the CPU 5 after the startup of the OS, and various data which are read from the CPU 5 as needed and which are other than the above-described data are stored thereat. At this area, arbitrary data including image data as well are stored as needed.

Figure 4:
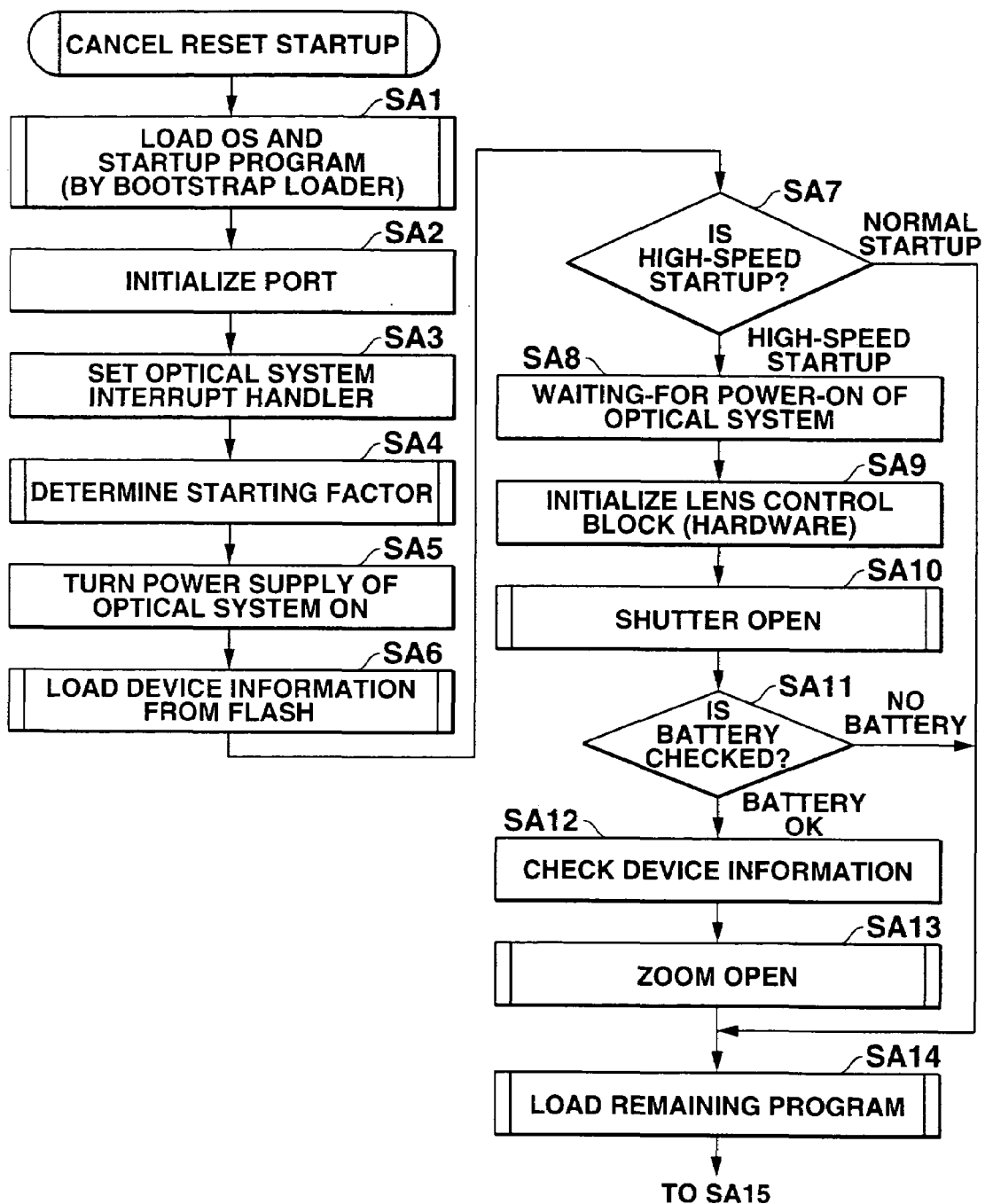
FIG. 4 is a former part of a flowchart showing a processing procedure of a CPU at the time of startup of the electronic still camera of the embodiment.
Figure 5:
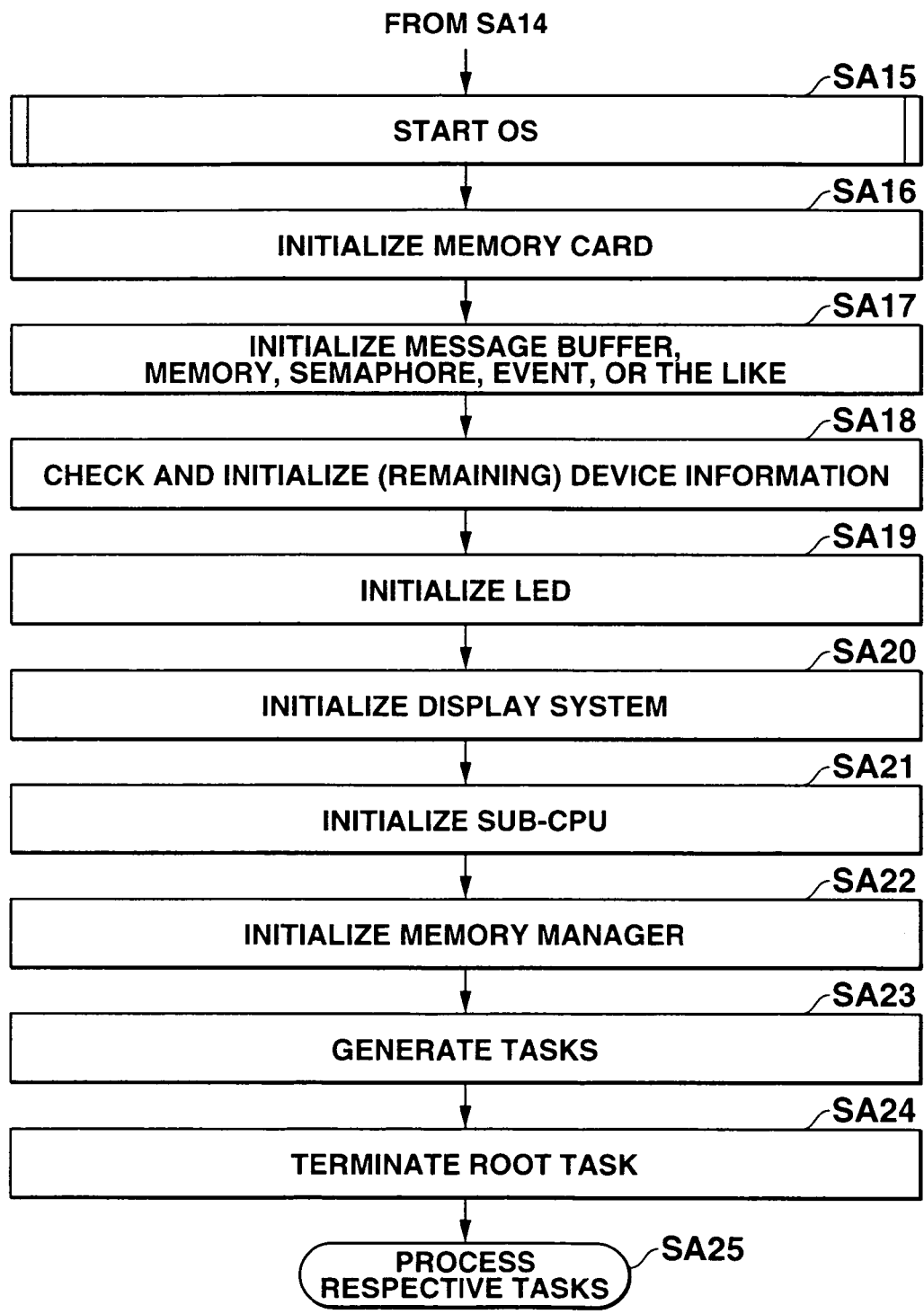
FIG. 5 is a latter part of the flowchart showing the processing procedure of the CPU at the time of startup of the electronic still camera.

Next, operations according to the present embodiment of the electronic still camera comprising the above-described configuration will be described in accordance with FIGS. 4 to 8. Flowcharts of FIGS. 4 and 5 show the concrete processing procedures of the CPU 5 at the time of startup accompanying an ON-operation of the power switch. FIG. 8 shows a sequence of main operations performed when the recording mode is set at the time of startup the camera.

After the CPU 5 is started up accompanying power-on, the CPU 5 loads only the boot program 101 from the program area 41b of the flash memory 41 by bootstrap loader, and expands those in the internal memory (step SA1 and period P1 in FIG. 8). The bootstrap loader is a small program which is read for loading the program, and is to be automatically accessed by the CPU 5 at the same time of the startup, and is stored in a predetermined address area (other than the memory area 41c) of the flash memory 41. Thereafter, the CPU 5 processes root tasks from step SA2 up to step SA14 on the basis of the boot program 101.

Setting of hardware such as an initialization of a port or the like is carried out (step SA2), and setting of an optical system interrupt handler, i.e., setting of interrupt processing required for the control of the lens group 11 is carried out (step SA3). A state signal is received from the sub-CPU of the key input unit 8, and a determination of a starting factor is carried out (step SA4). Here, it is determined whether the mode state which has been set is a recording mode for photographing or another mode other than the recording mode, such as a playback mode for displaying a recorded image or the like. The difference between the recording mode and the playback mode is whether or not a lens is required to be protruded when the power is turned on. If the operation mode is the recording mode, the lens is required to be protruded when the power is turned on. The power supply of the optical system such as the lens block 1, the driver block 2, and the lens control block 43 is controlled so as to be turned on (step SA5), and device information is loaded from the flash memory 41 (step SA6). It is determined whether high-speed startup is carried out or normal startup is carried out on the basis of the determined results of the starting factor acquired in step SA5 (step SA7). When the mode which has been set is the recording mode, it is determined as the high-speed startup, and when the mode is another mode other than it, it is determined as the normal startup.

When the starting factor is the normal startup, the processings of the following steps SA8 to SA13 are not carried out, loading of the main program 102 which is the remaining control program is immediately started (step SA14).

On the other hand, when the starting factor is the high-speed startup, a predetermined time (for example, 30 ms or less) until the time when a voltage of the optical system started to be supplied in step SA5 rises a steady-state voltage is waited for (step SA8), and an initialization of the hardware in the lens control block 43 is carried out (step SA9). The shutter actuator 17 is made to start shutter open of the mechanical shutter (step SA10 and period P2 in FIG. 8), a battery voltage is checked at this point in time, and it is determined whether or not the battery voltage exceeds a predetermined voltage (step SA11). Note that, some waiting-for processings are carried out during from the time when the shutter open of the mechanical shutter is started to the time of the check for the battery voltage. Here, when the voltage value is the predetermined value or less, and it is determined as "No Battery," the processings of the following steps SA12 and SA13 are not carried out, loading of the main program 102 which is the remaining control program is immediately started (step SA14).

On the other hand, when the voltage value exceeds the predetermined value, and it is determined as "Battery OK," a check and an initialization of the adjustment data for the zoom lens and the focus lens among the device information loaded in step SA6 are carried out (step SA12), and the protrusion (zoom-open) of the zoom lens for an initialization of the lens group 11 is made to start (step SA13 and period P3 in FIG. 8).

Figure 6:
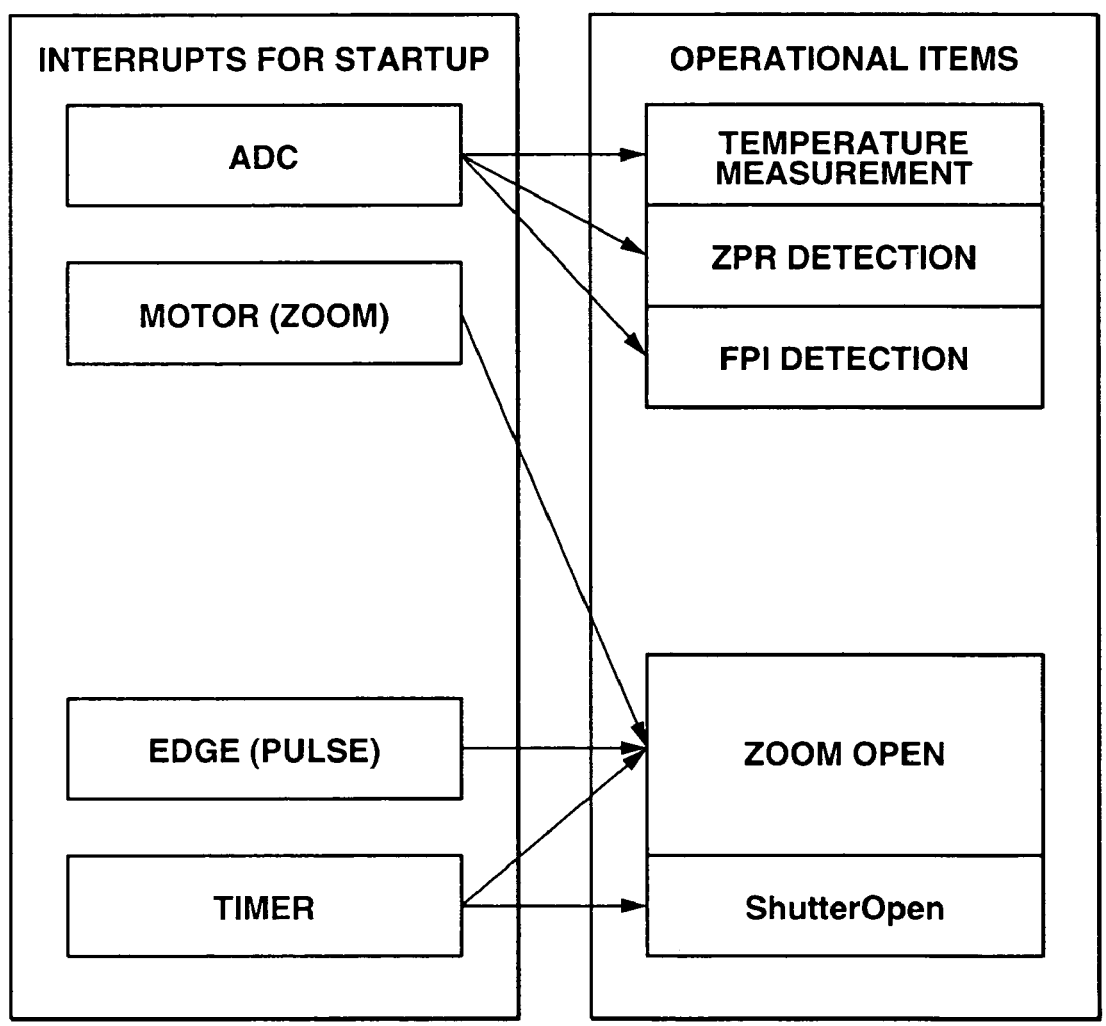
FIG. 6 is a schematic diagram showing relationships between types of startup interrupt processings and operational items realized by the respective interrupt processings.

Here, the zoom-open processing of the zoom lens will be described. The processing is carried out by the interrupt which is set at step SA3. FIG. 6 is a schematic diagram showing the relationship between types of the interrupts for startup and operational items realized by the respective interrupts, and the zoom-open processing is achieved by ADC, MOTOR (ZOOM), edge (pulse), and timer interrupts. The ADC interrupt carries out analog-to-digital conversion with respect to the detected value from a photo interrupter (or photoelectric sensor, not shown) provided at the camera body, and outputs the value. The MOTOR (ZOOM) interrupt controls an output of the zoom motor 14. The edge (pulse) interrupt detects a moving amount of the zoom lens by counting of the number of pulses. Timer interrupt performs a time count and a timing adjustment and realizes a shutter-open processing.

Figure 7:
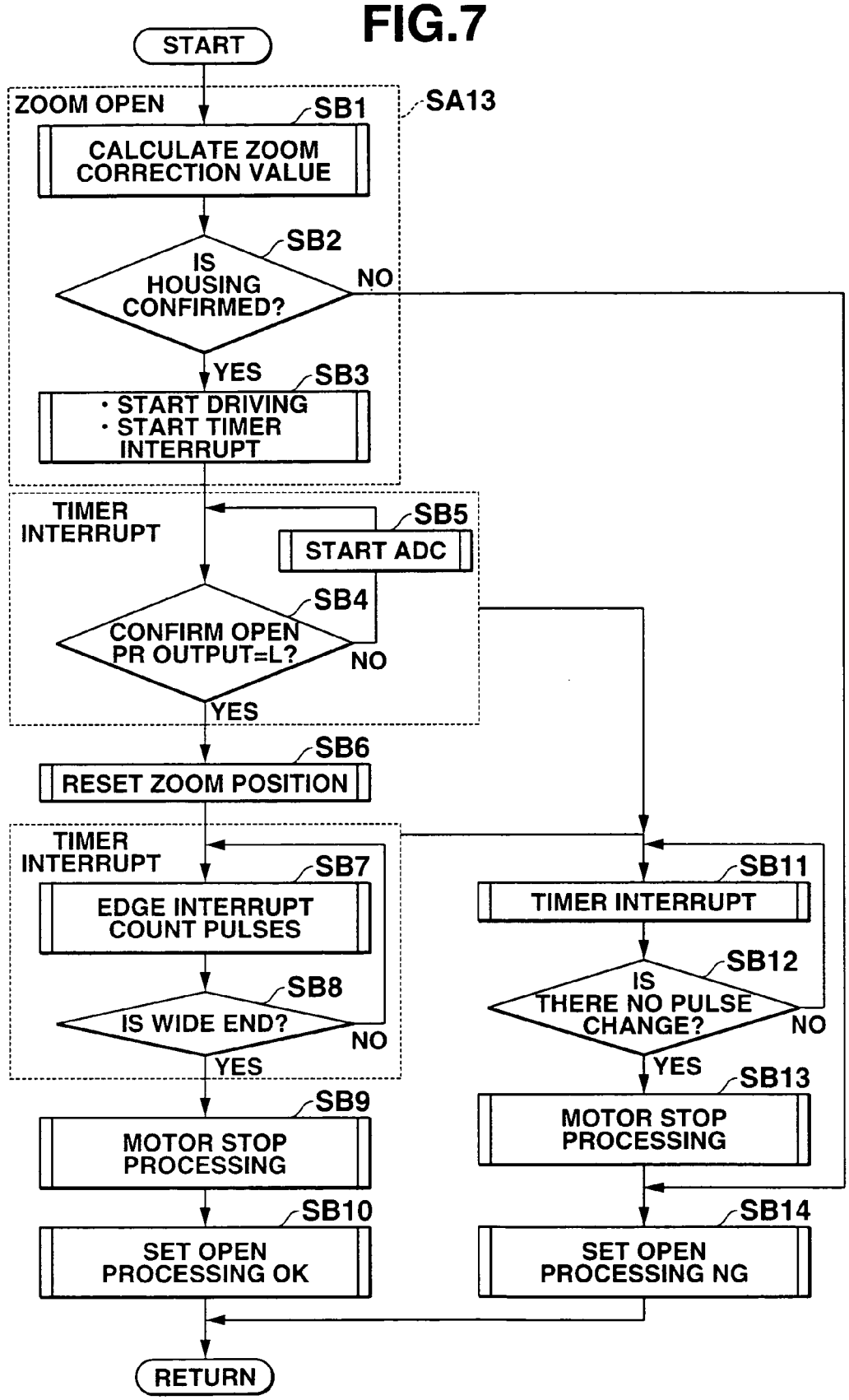
FIG. 7 is a flowchart showing a zoom-open processing of the embodiment.
Figure 8:
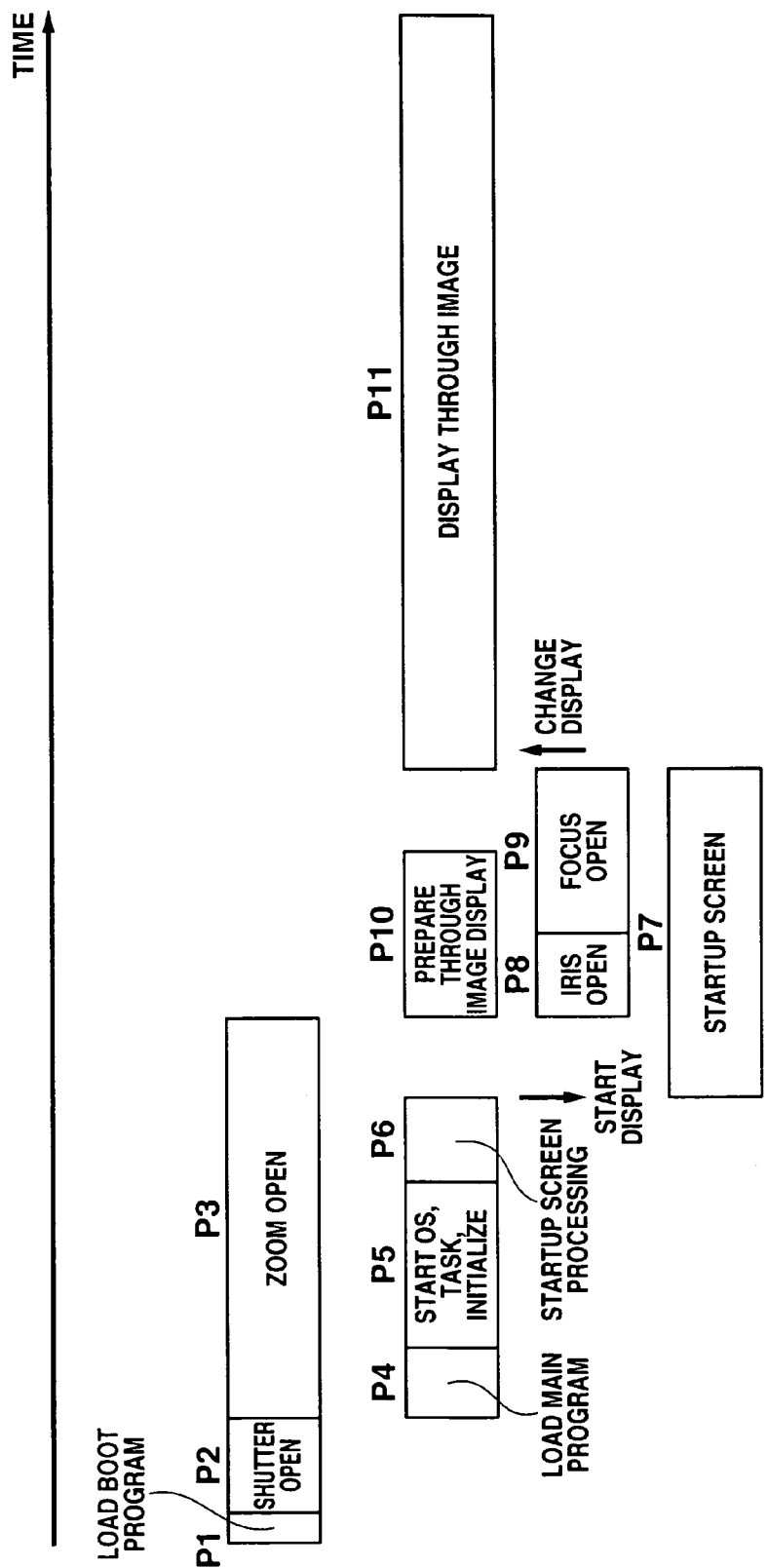
FIG. 8 shows a sequence of main operations performed after the camera device is started when the recording mode is set.

FIG. 7 is a flowchart showing the zoom-open processing (step SA13 of FIG. 4). A zoom correction value, i.e., a moving amount up to a target position to which the zoom lens is protruded is calculated on the basis of the device information (step SB1). Confirmation of housing of the lens group 11 is carried out (step SB2). The confirmation is carried out by confirming whether a detected level (PR output) due to the ADC interrupt is "H" or "L."

Thereafter, driving of the zoom lens by the MOTOR (ZOOM) interrupt and the timer interrupt are started (step SB3).

At the beginning, the confirmation of detecting of the PR output is continued, and it is determined whether the zoom lens is released from the state of being housed or not (steps SB4, SB5). When the zoom lens is released from the state of being housed (YES in step SB4), after a moving amount of the zoom lens is once reset (step SB6), moving pulses (edge pulses) are counted one by one (step SB7). When the zoom lens reaches the target position (e.g., a Wide end) in a short time (YES in step SB8), driving of the zoom lens is stopped (step SB9), the processing OK is set and reported to the outside (step SB10), and the driving processing is completed. Note that, on the way of the processing, when the state of the zoom lens being housed cannot be confirmed (NO in step SB2), when it cannot be confirmed that the zoom lens is released from the state of being housed, and when the moving pulses cannot be counted, the driving of the zoom lens is stopped due to error processing, processing NG is set and reported to the outside (steps SB11 to SB14), and the driving processing is completed.

Immediately after the above-described zoom-open processing (step SA13) of the zoom lens is started, the CPU 5 starts loading of the remaining program (step SA14 and period P4 in FIG. 8). Namely, without the end of the zoom-open operation of the lens group 11 being waited for, the main program 102 is loaded simultaneously.

After the main program 102 is loaded, an OS is started up (step SA15 and P5 in FIG. 8). Continuously, an initialization of the hardware, i.e., a memory card of the image recording unit 42, a message buffer, the DRAM 6 or the like (steps SA16, SA17), checking of the remaining data of the device information (other than the adjustment data of the zoom lens and the focus lens), and an initialization of the CCD image pickup system block 3 by using those data (step SA18) are carried out. Initializations of an LED and the display system are carried out (steps SA19, SA20). Moreover, initializations of the software, i.e., initialization of the sub-CPU (various settings) and an initialization of a memory manager are carried out (steps SA21, SA22). Some of initializations of the sub-CPU are already carried out at the time of the determination of a starting factor in step SA4. After the respective tasks realizing various operations in the main program 102 which completed loading are generated (step SA23), the termination processing of the root task is carried out (step SA24). After these processings, the memory area 41*c* becomes a usable state.

Hereafter, the routine proceeds to the execution of the processings corresponding to the respective modes for recording and playback in the same way as in the normal processing based on the processings of the plurality of tasks generated (step SA25). Namely, the CPU 5 executes the following processings by executing the respective tasks in accordance with the main program 102.

First, when the determined result in step SA11 described above is "No Battery," a predetermined termination processing is carried out. Further, when the determined result is "Battery OK," the routine proceeds to a processing corresponding to an operation mode which has been set, and the processing by a recording mode or a playback mode is carried out. When the recording mode is set, as shown in FIG. 8, a startup screen display processing is performed (period P6). Until the display unit 7 starts display of a through image, a predetermined startup screen is displayed instead of the through image. The period P7 is for preparing the display of the startup screen based on image data stored in the memory are 41c of the flash memory 41 or arbitral image data previously set by the user as the startup screen. During period P7, the startup screen is displayed.

While displaying the startup screen, the iris is made to be in a state of being open by driving the actuator 16 for iris (period P8 of FIG. 8) after the termination of the zoom-open operation of the zoom lens started at the above-described step SA13 (refer to FIG. 4). Thereafter, the focus motor 15 is driven, and a movement to the initial position of the focus lens (FOCUS OPEN) in the lens group 11 is started (period P9 of FIG. 8). Further, during the time, about that time of the control of the iris, a preparation for startup of a through image by an initialization of the image pickup system of the CCD 31, the white balance characteristic, and the like is started, and the preparation is completed during the operation of the focus motor 15 (period P10 of FIG. 8). Thereafter, at the point in time when the focus lens reach the initial position, the through image is displayed on the image display unit 7 (period P11 of FIG. 8), and the routine comes into a state of being on standby for photographing.

As described above, in the present embodiment, when a recording mode is set when the device is started up by power-on, initializing operation (steps SA8 to SA13) in which the lens group 11 is zoomed open is immediately started without waiting the startup of the OS, and during the time, operations required for the other initializations are simultaneously carried out. Accordingly, a starting time required for photographing in the configuration having movable lens 11 can be markedly reduced, and speedup of the starting time is possible.

Instead of waiting the completion of the zoom open processing which starts by the boot program, a main program is loaded in parallel with the zoom open processing. Thus, the time required for the other initializations is shortened to thereby shortening the total starting time.

Note that, differently from the present embodiment, it may be configured such that the boot program 101 and the main program 102 are collectively loaded, or such that some of the boot program 101 and the main program 102 are loaded. In this case as well, in the same way as in the present embodiment, by simultaneously carrying out the operations required for other initializations except for the zoom-open operation of the lens group 11 during the time when the zoom-open operation of the lens group 11 is being carried out, speedup of the starting time is possible.

Further, as in the present embodiment, even if the device is a type in which the flash memory 41 cannot carry out random-access, due to the OS 102A, the boot program 101, and the main program 102 being serially stored in the flash memory 41, the boot program 101 can be efficiently divided and loaded. Accordingly, efficiency of the processing at the time of startup can be improved, and speedup of the starting time is possible thereby as well.

Further, as in the present embodiment, even if the device is a type in which the flash memory 41 cannot carry out random-access, due to the OS 102a, the boot program 101 and the main program 102 being continuously stored in the flash memory 41, the boot program 101 and the main program 102 can be efficiently loaded. Accordingly, efficiency of the processing at the time of startup can be improved, and speedup of the starting time is possible thereby as well.

In accordance with the embodiment of the present invention, in a camera device displaying the through image, the startup time is further shortened by starting the display of the through image while displaying the startup screen. The same effect is expected for a camera other than that loads the main program 102 during the zoom open processing by the boot program 101.

What is claimed is:

1. A camera device comprising:
   an optical system;
   a driving unit which drives the optical system;
   a control unit which:
   (i) when the camera device is started up in a state in which a recording mode for photographing is set, controls the driving unit to move the optical system to a predetermined state by an initialization processing based on a startup program which does not comprise an operating system and then starts a control based on a control program comprising the operating system, and
   (ii) when the camera device is started up in a state in which a playback mode for display is set, starts the control based on the control program comprising the operating system without moving the optical system to the predetermined state by the initialization processing based on the startup program; and
   a memory which stores the startup program and the control program, wherein when in the recording mode the control unit reads the startup program from the memory, starts to move the optical system to the predetermined state by the initialization processing based on the startup program, and then reads the control program from the memory without waiting for the optical system to reach the predetermined state.

2. The camera device according to claim 1, wherein the memory stores the control program continuously after the startup program.

\* \* \* \* \*